(No Model.) 2 Sheets—Sheet 2.
G. W. REAGAN.
ANIMAL TRAP.
No. 247,214. Patented Sept. 20, 1881.
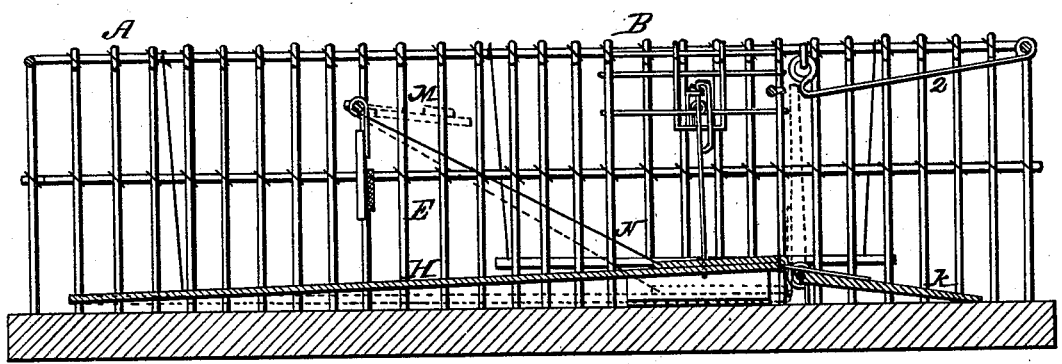
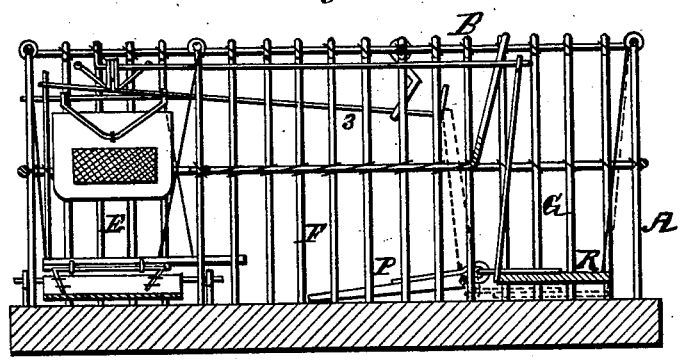

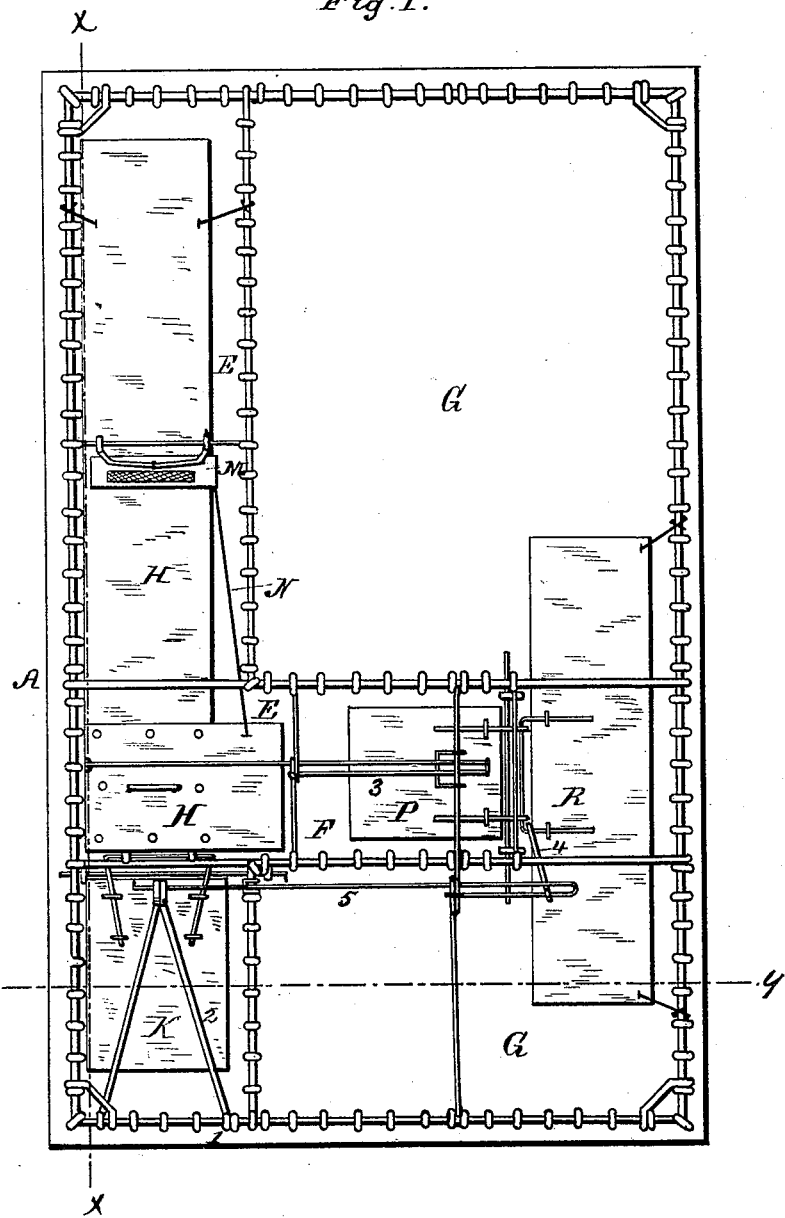

UNITED STATES PATENT OFFICE.

GEORGE W. REAGAN, OF OWENSBOROUGH, KENTUCKY.

ANIMAL-TRAP.

SPECIFICATION forming part of Letters Patent No. 247,214, dated September 20, 1881.

Application filed June 27, 1881. (No model.)

*To all whom it may concern:*

Be it known that I, GEORGE W. REAGAN, a citizen of the United States, residing at Owensborough, in the county of Daviess and State of Kentucky, have invented certain new and useful Improvements in Animal-Traps; and I do hereby declare the following to be a full, clear, and exact description of the invention, such as will enable others skilled in the art to which it appertains to make and use the same, reference being had to the accompanying drawings, and to the letters or figures of reference marked thereon, which form a part of this specification.

My invention relates to animal-traps; and the novelty consists in the construction and arrangement of parts, comprising a self-locking and self-setting prison-trap, as will be more fully hereinafter set forth, and specifically pointed out in the claim.

The invention is designed as an improvement upon the patent granted to me January 11, 1881, No. 236,456.

The present invention is fully illustrated in the accompanying drawings, in which Figure 1 is a top-plan view with the top removed; Fig. 2, a longitudinal section through the lines *x x* of Fig. 1; and Fig. 3, a transverse section through the line *y y*, Fig. 1.

For convenience I will describe the parts which are equivalents of the parts in the hereinbefore-mentioned patent briefly, and to this end referring to the drawings—

A represents the rectangular cage, having hinged cover B, and divided in its interior into compartment E, into which the animal enters, the compartment F leading therefrom to the compartment or prison G.

H indicates a platform suspended in the compartment E, and connected loosely at its forward end to a pivoted door, K, which is hung in such a manner that the weight of the animal upon the platform H in the compartment E will elevate and close the passage against its return.

M represents the bait-frame, pivoted in the upper portion of the compartment E, and connected to the platform H by rod N in such a manner that the weight of the animal will elevate the bait out of reach automatically.

The compartment F is provided with a pivoted platform-door, P, connected with a platform, R, in such a manner that the weight of the animal upon the platform R will close the door P against escape.

Hinged to the frame at 1 is a gravital catch, 2, which serves to hold the door K when elevated in a locked position, thus permanently closing the avenue of escape in that direction and automatically opening the door P by means of the rod 3. The animal passes from the compartment E to the compartment G, when its weight upon the platform R will elevate the door P until it passes beyond the free end of the rod 3, which falls and locks it in closed position, and at the same time a link, 4, depresses a rod, 5, and trips the gravital catch 2, releasing the door K, which falls, and the trap is again set for another animal.

The means for locking the door K and automatically opening the door P, and the means for closing the door P and opening the door K in like automatic manner, constitute the novelty in this application.

What I claim as new is—

The combination of the door K and platform H, the door P and platform R, and the bait-frame M and rod N with the catch 2, locking-rod 3, link 4, and trip-lever 5, all connected and operating as described and shown.

In testimony whereof I affix my signature in presence of two witnesses.

GEO. W. REAGAN.

Witnesses:
 A. B. MILLER,
 GEO. F. HAYNES.